July 5, 1932. J. M. DAILY 1,865,433
APPARATUS FOR PURIFYING WATER WITH OZONE
Filed July 5, 1929
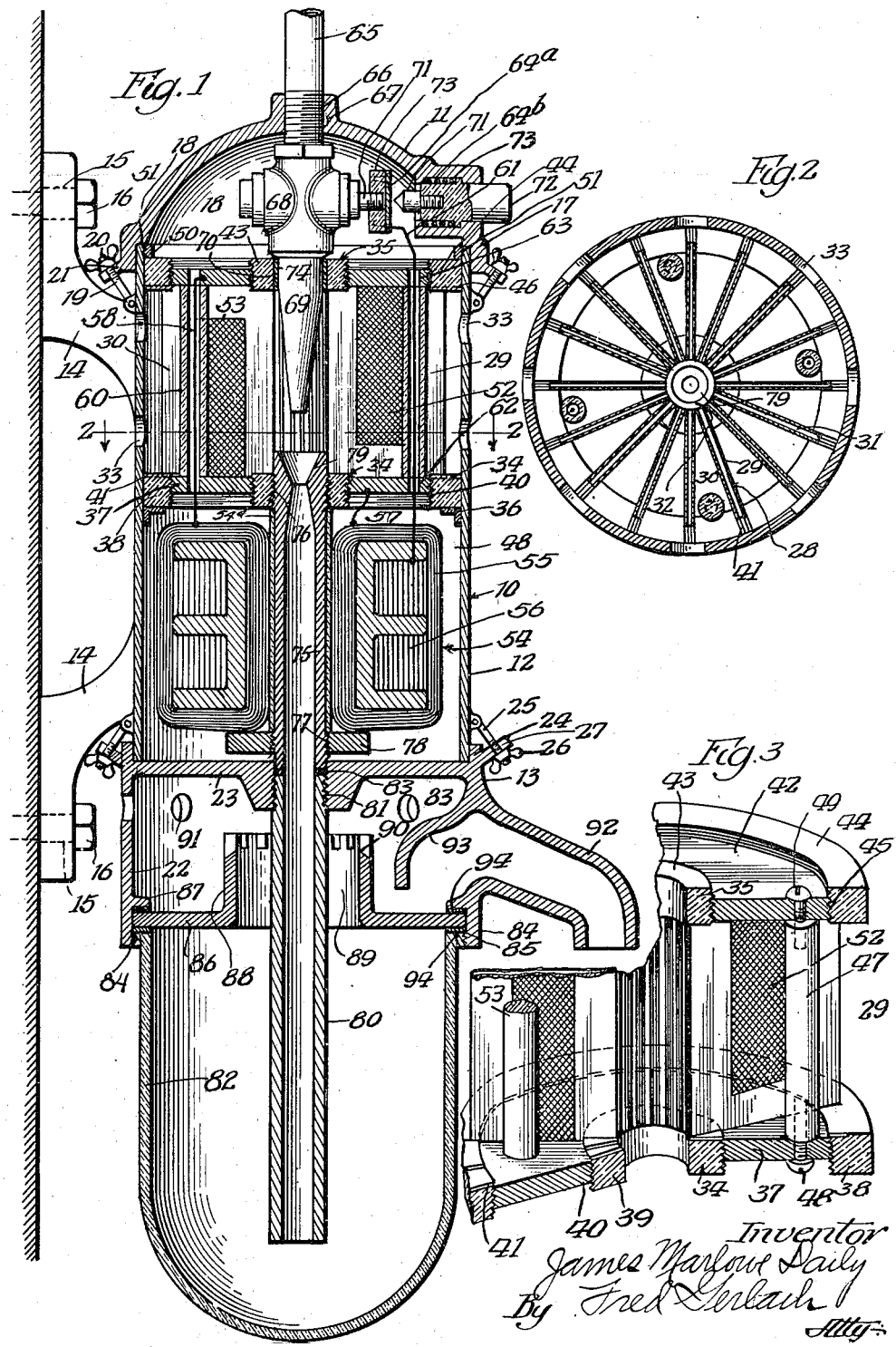

Patented July 5, 1932

1,865,433

UNITED STATES PATENT OFFICE

JAMES MARLOWE DAILY, OF CHICAGO, ILLINOIS, ASSIGNOR TO AMERICAN OZONE COMPANY, OF CHICAGO, ILLINOIS, A CORPORATION OF ILLINOIS

APPARATUS FOR PURIFYING WATER WITH OZONE

Application filed July 5, 1929. Serial No. 376,111.

The present invention relates generally to apparatus for purifying water with ozone or ozonous air, and more particularly to that type of water purifying apparatus which includes an electric ozone generator.

One object of the invention is to provide an apparatus of the aforementioned type, in which the various operating parts, such as the generator, the transformer that is associated with the generator, and the receptacle or part for separating or liberating the ozone from the purified water, are mounted in superposed relation and are compactly housed within a casing so that the apparatus as a whole is of a unitary character, occupies but a comparatively small amount of space, and is particularly adapted for home use.

Another object of the invention is to provide an apparatus of the character under consideration, in which the water to be purified is delivered into the casing in such a manner that it operates to draw the air from which the ozone is formed through the units of the generator and causes the ozone that is formed by the units to be affiliated therewith.

A further object of the invention is to provide a water purifying apparatus of the aforesaid type, which embodies a pipe which extends through the transformer and between the generator and separator part and operates to conduct the ozone-containing water to the separator part.

A still further object of the invention is to provide an apparatus for purifying water with ozone, which is generally of new and improved construction and in which provision is made whereby ready access may be had to the operating parts in the event that repair or replacement thereof becomes necessary.

Other objects of the invention and the various advantages and characteristics of the present construction will be apparent from a consideration of the following detailed description.

The invention consists in the several novel features hereinafter set forth and more particularly defined by the claims at the conclusion hereof.

In the drawing which accompanies and forms a part of this specification or disclosure and in which like numerals of reference denote corresponding parts throughout the several views:

Figure 1 is a vertical sectional view of a water purifying apparatus embodying the invention;

Figure 2 is a transverse section taken on the line 2—2 of Figure 1 and illustrating the construction and arrangement of the generator-units; and Figure 3 is a perspective view of one of the units, disclosing in detail the manner in which the glass distributing plates of such unit are held in place.

The apparatus which forms the subject matter of the present invention is adapted for purifying water by means of ozone, and comprises a generator for forming ozone or ozonous air, a pipe for mixing the ozone with the water to be purified, and a receptacle for separating or liberating the ozone from the water after it has been associated with the latter a sufficient length of time for purifying purposes. The generator, mixing pipe and separator and the various parts that are associated therewith and hereafter described, are contained within a casing 10 so that the apparatus as a whole is compact and of a unitary character. This casing is elongated and is adapted to be arranged in a vertical position. It comprises a top 11, a body-member 12, and a bottom 13, all of which are preferably formed of aluminum or a similar light and durable metal. The body-member 12 is cylindrical and is hollow from one end thereof to the other. Brackets 14 are formed integrally with the body-member at one side thereof and permit the casing to be secured to any suitable supporting structure. Said brackets 14 have formed therein circular apertures 15 for receiving attaching bolts 16 that are adapted to extend into the supporting structure. The top 11 is hemispherical in conformation and embodies a depending annular flange 17 which is adapted to surround the upper end of the body-member 12 so as to hold the top in place and against displacement relatively to said body-member. The portion of the top 11 that is disposed adjacent to the annular depending flange 17 is shaped to form a shoulder 18 which is adapted to rest directly upon the upper edge of the body-member 12 when the top is in its operative position. Bolts 19 operate to connect removably the top 11 to the body-member 12 of the casing. These bolts are pivotally connected to the upper end of the body-member and embody wing-nuts 20 at the distal ends thereof. These nuts are adapted to engage lugs 21 on the flange 17 and serve, when the bolts are in their operative position, to clamp the top against the body-member. The lugs 21 are slotted so that the bolts 19 may be swung downwardly and out of engagement therewith in the event that the top of the casing is to be removed. The bottom 13 comprises a cylindrically shaped wall 22 and a cross-wall 23 which is connected to and formed integrally with the upper end of the cylindrical wall 22 and is adapted to fit against the lower edge of the body-member 12. In addition to the walls 22 and 23, the bottom 13 of the casing comprises an upwardly extending annular flange 24 which is adapted to surround the lower end of the body-member 12 in order to prevent transverse displacement of the bottom relatively to the body-member when said bottom and body-member are in connected relation. Bolts 25 are pivotally connected to the lower end of the casing member 12 and are provided at their distal ends with wing-nuts 26 which are adapted to engage lugs 27 on the annular flange 24 and operate to clamp removably the bottom 13 in place against the body-member 12.

The generator is housed within the upper end of the body-member 12 of the casing and consists of a plurality of units 28 which are arranged in an annular series. Each of these units comprises a pair of glass or mica plates 29 and 30 which are arranged in parallel relation and are spaced a small distance apart to form a space 31 that operates as a combined air passage and spark gap. The plates 29 and 30 of the units 28 are preferably rectangular in shape and are positioned in radial relation and so that the inner edges thereof form a central and vertically extending conduit 32 into which open the inner portions of the spaces 31. The outer portions of said spaces are adapted to receive air through circular apertures 33 which are drilled or otherwise formed in the upper portion of the body-member 12. The air that passes into the casing through the holes 33 is drawn inwardly through the spaces 31 and is formed into ozone during its passage between the plates 29 and 30, as hereinafter described.

The units 28 are held in their operative position by a pair of disk-like members 34 and 35. The member 34 is adapted to rest on an angle iron bracket 36 which is rigidly secured to the inner periphery of the body-member 12 and is located medially with respect to the ends of said body-member. Said member 34 consists of a ring 37 and a pair of washers 38 and 39. The ring 37 is formed of any suitable conducting material, such as brass, and is positioned between and in concentric relation with respect to the washers 38 and 39. The latter are made of insulating material and are secured to the ring 37 by screw thread connections 40. The upper faces of the washers 38 and 39 are provided with radially extending grooves 41 into which fit the bottom portions of the plates 29 and 30. The upstanding or raised parts of the washers which are disposed intermediately with respect to the grooves 41 serve to retain the plates of the units 28 in fixed relation. The disk-like member 35 is located adjacent the upper edge of the body-member 12 and consists of a ring 42 and a pair of washers 43 and 44. The ring 42 is similar in shape to the ring 37 of the member 34 and is likewise formed of conducting material. The washers 43 and 44 are formed of insulating material and are positioned adjacent to the inner and outer peripheral portions of the ring 42 respectively. They are secured to the ring 42 by means of screw thread connections 45. The lower faces of the washers 43 and 44 are provided with radially extending grooves 46 which correspond in number to and are aligned with the grooves 41 and operate to receive the upper portions of the plates 29 and 30. Vertically extending posts 47 operate to connect the disk-like members 34 and 35 together in such a manner that the plates 29 and 30 are held in clamped relation. These posts are formed of insulating material and extend between the rings 37 and 42. The disk-like member 34 is connected to the lower ends of the posts by means of screws 48 which are carried by the posts and extend through the ring 37. The upper disk-like member 35 is secured to the upper ends of the posts 47 by means of screws 49 which are carried by said posts and extend through the ring 42. A characteristic and an advantage of utilizing the posts 47 is that the disk-like members 34 and 35 and the units 28 are locked together in rigid relation and are in the form of a unit which may be readily inserted into place and removed when the top 11 is disconnected with respect to the body-member 12. To prevent displacement of the generator units and the disk-like members 34 and 35, a band 50 is provided. This band is connected to the upper end of the body-member 12 by a screw thread connection 51 and is adapted to bear against the washer 44. When the band 50 is shifted downwardly with respect to the casing, the disk-like members 34 and 35 are clamped between the bracket 36 and the band and consequently are held against axial displacement with respect to the casing 10.

The plates 29 of the generator units 28 operate as dielectrics and have electrodes 52 embedded therein. These electrodes are formed of any suitable material and are so positioned that the upper ends thereof bear directly against and are in electrical connection with the ring 42. The lower ends of the electrodes 52 terminate above the lower edges of the plates 29 so that they are spaced and insulated from the ring 37 of the disk-like member 34. By having the electrodes arranged in the manner set forth, the ring 42 serves as a conductor whereby all of the electrodes 52 are connected together. The plates 30 of the units 28 operate as dielectrics and have embedded therein electrodes 53. These electrodes are adapted to cooperate with the electrodes 52 in producing electrical sparks across the spaces 31 for the purpose of forming the air which passes through such spaces into ozone. The aforesaid electrodes 53 are so positioned in the plates 30 that the lower ends thereof engage directly against and connect electrically with the conductor ring 37 of the disk-like member 34. The upper ends of the electrodes 53 are positioned beneath the upper edges of the plates 30 so that they are spaced and insulated from the ring 42.

The generator is actuated electrically by means of a transformer 54 which is positioned in and enclosed by the lower part of the body-member 12. This transformer is preferably of the "hedgehog" type and comprises a pair of coils or winding 55 and 56. The winding 55 is provided with a pair of conductors 57 and 58 which are connected to the rings 37 and 42 respectively. The conductor 57 is soldered or otherwise secured to the bottom face of the ring 37. The conductor 58 extends upwardly through a hole 59 in the ring 37 and is connected at its upper end to the under face of the ring 42. A porcelain tube 60 surrounds the central portion of the conductor 58 and operates to insulate said conductor from the ring 37. The winding 56 is adapted to be connected to any suitable source of electrical current and embodies a conductor 61 which extends through aligned openings 62 and 63 in the rings 37 and 42 respectively, and includes a switch 64. The latter is housed in the top 11 and comprises a pair of contacts 64$^a$ and 64$^b$. When these two contacts are shifted into engagement with one another, the transformer 54 is operated with the result that the electrodes 52 and 53 cause sparks to jump across the spaces 31 for ozone forming purposes.

The water to be purified is introduced into the casing 10 through a pipe 65. The latter is preferably connected to any suitable source of supply wherein the water is under pressure, and extends into the top 11 in such a manner that it is positioned coaxially with respect to the casing. The end or part of the pipe 65 that extends into the top 11 is connected by a screw thread connection 66 to a boss 67 that is formed integrally with the central portion of the top 11. A valve 68 is connected to the threaded end of the pipe 65 and is provided with a nozzle 69 which extends downwardly through an opening 70 in the washer 43 and projects so that the discharge end thereof is positioned in the conduit 32. The nozzle 69 is adapted, when the valve 68 is open, to jet the water downwardly with such force that a partial vacuum is created in the conduit 32. This partial vacuum causes the air adjacent to or surrounding the casing 10 to be drawn inwardly through the opening 33 and through the spaces 31. As previously pointed out, the electrodes 52 and 53 form the air passing through the spaces 31 into ozone. This ozone or ozonous air is drawn into the conduit 32 by the partial vacuum and there commingles and unites with the jet of water emanating from the nozzle 69. The valve 68 is controlled by a push-rod 71 which is pressed into its closed position by a spring (not shown) and has an abutment-member 71$^a$ secured to the outer end thereof. The contact 64$^a$ of the switch 64 is secured to this abutment-member. A finger button 72 is slidably mounted in the top 11 directly opposite to the push-rod 71$^a$. This button is formed of insulating material and has the contact 64$^b$ secured to the inner end thereof. When the button 72 is pressed inwardly, engagement of the contacts 64$^a$ and 64$^b$ is effected with the result that switch 64 is closed and the transformer 54 is actuated to cause current to be supplied to the generator units 28. After engagement of the two switch contacts, further inward movement of the button 72 causes the push-rod 71 to be shifted inwardly and the valve 68 to be thereby opened. A coil spring 73 is applied to the button 72 so as to press the same outwardly. A characteristic and an advantage of having the switch and the valve controlled by the button 72 in the manner set forth is that the generator units 28 will be actuated prior to the opening of the valve and consequently a supply of ozone will be on hand during the initial discharge of the water from the nozzle 69. In the event the user desires to have the generator units in operation for a short period before opening of the valve 68, the push-button will be held momentarily or as long as desired in the position wherein only the switch 68 is manipulated. Packing 74 is interposed between the upper end of the nozzle and the washer 43 so as to preclude the entry of air into the upper end of the conduit 32.

A mixing pipe 75 is positioned centrally in the lower part of the body-member 12 and extends between the lower disk-like member 34 and the bottom 13. The upper end of this pipe extends through the central portion of the washer 39 and is connected to the latter by a screw thread connection 76. The lower end of the pipe 75 bears against the central portion of the cross-wall 23 and is provided with an external screw thread 77 upon which is mounted a nut 78. The latter operates to support the transformer 54. By rotating the nut 78 in one direction or the other, the transformer 54 may be adjusted vertically into the desired position. A sleeve 54ᵃ of insulating material serves to insulate the transformer from the pipe 75. This sleeve is secured to the transformer in any suitable manner. The pipe 75 is aligned with the nozzle 69 of the valve 68 and is adapted to receive the ozone-containing water from the conduit 32. The upper end of said pipe 75 is shaped so that the entrance portion thereof tapers downwardly and forms a conoidal mouth 79 which receives the water and is of a restricted character so as to enable the water to recuperate substantially its original pressure. The lower end of the pipe 75 communicates with a tube 80 which is connected by a screw thread 81 to the central portion of the cross-wall 23 and projects downwardly and discharges into a receptacle 82. The latter is preferably formed of glass or a similar transparent material and forms a reservoir or tank in which the ozone-containing water is momentarily stored for purifying purposes. A gasket 83 is interposed between the contiguous ends of the pipe 75 and the tube 80 and is compressed to form a water tight seal, when the bottom 13 is clamped against the body-member 12 by the wing-nuts 26 on the bolts 25. The upper end of the receptacle 82 is provided with a metallic ring 84 which is connected by a screw thread connection 85 to the lower end of the annular wall 22. A cover 86 fits over the top part of the receptacle 82 and is clamped in place between the ring 84 and an annular bead or rib 87 which is formed integrally with the lower end of the wall 22. The central portion of the cover 86 is provided with an upstanding discharge element 88 which extends around the tube 80 and is spaced from the latter to form a ring-shaped outlet duct 89 for the ozone-containing water. The upper end of the element 88 is serrated and cut so as to form a plurality of sharp edges 90 over which the water catapults outwardly into the interior of the bottom 13 after it passes upwardly through the duct 89. By causing the water to be discharged from the receptacle 82 in the form of thin streams, the ozone is liberated. Apertures 91 are punched or otherwise formed in the upper portion of the wall 22 and serve to permit of the escape of the free ozone.

A spout 92 is connected to one side of the wall 22 and operates to discharge or drain the purified water from the interior of the bottom 13. A baffle plate 93 is positioned adjacent the inner end of the spout 92 in such a manner that it operates to prevent the water passing through the spout from drawing the ozone in the upper part of the bottom 13 into contact therewith. Gaskets 94 are disposed between the rib 87 and the ring 84 so as to seal the lower part of the bottom 13.

The operation of the apparatus will be as follows: When the user desires to obtain purified water, the button 72 will be pressed inwardly against the action of the spring 73. This operation closes the switch 64 and opens the valve 68. Upon the closing of the switch 64, the transformer 54 is actuated so as to cause the electrodes 52 and 53 to produce ozone forming sparks across the spaces 31 between the plates 29 and 30. The ozone which is formed in the aforesaid spaces 31 is drawn inwardly by virtue of the partial vacuum that exists in the conduit 32 due to the jet of water which emanates from the nozzle 69. The jet of water, as it passes downwardly, draws the ozone in the conduit 32 into contact and affiliation therewith and is forced against the conoidal mouth 79. From this mouth the ozone-containing water passes downwardly through the pipe 75 and the tube 80 into the glass receptacle 82. The ozonated water remains in this receptacle for a sufficient length of time to enable the ozone to produce the desired purifying action. From the receptacle 82 the ozone-containing water passes upwardly through the duct 89 and then spills in thin streams over the edges 90 and onto the top surface of the cover 86 from which it is drained by the spout 92. As the water passes over the edges 90, the ozone is liberated therefrom and is evacuated from the casing through the apertures 91. When access is desired to the generating units 28, the top 11 of the casing 10 is removed by loosening the wing-nuts 20 and swinging the bolts 19 out of engagement with the lugs 21. Upon removal of the top the band 60 is removed, thereby permitting of the complete removal of the generating units and the transformer.

In the event that it becomes necessary to clean the cover 88 so that the edges 90 are free from foreign matter, the receptacle 82 is disconnected from the bottom 13 simply by rotating the same to disconnect the ring 84 from the threaded part of the wall 22. After the receptacle 82 is removed, the cover 68 may be shifted downwardly out of its position around the tube 80.

The apparatus herein disclosed, by virtue of the fact that the various operating parts thereof are arranged compactly within a casing, occupies but a comparatively small space and is particularly adapted for home use. Since the aforementioned operating parts are accessible, repair or replacement work may be done expeditiously and without difficulty.

The invention is not to be understood as restricted to the details set forth, since these may be modified within the scope of the appended claims, without departing from the spirit and scope of the invention.

Having thus described the invention, what

I claim as new and desire to secure by Letters Patent, is:

1. In an electric ozone generator, the combination of pairs of vertically extending rectangular dielectric plates, the plates of each pair being spaced apart to form therebetween a combined air passage and spark gap, a pair of conductor-members engaging the top and bottom edges of the plates, vertically extending posts of insulating material extending between the members and operating to clamp the latter against the aforesaid edges of the plates, a series of electrodes connected electrically to one of the conductor-members and associated with alternating dielectric plates, a second series of electrodes connected electrically to the other member, said second series of electrodes alternating with the first mentioned series and associated with the remainder of the dielectric plates, means for supplying electric current to the members, and means for forcing air through the passages.

2. In an electric ozone generator, the combination of pairs of plates arranged vertically and to form an annular series, the plates of each pair being spaced apart to form therebetween a combined air passage and spark gap, means forming a conduit in communication with the passage and disposed centrally with respect to said series of plates, means for creating a silent discharge across said passages to form the air therein into ozone, a pair of members engaging the upper and lower edges of the plates respectively, and posts extending between the members and operating to clamp the latter against the plates.

3. In an electric ozone generator, the combination of pairs of plates arranged vertically and to form an annular series, the plates of each pair being spaced apart to form therebetween a combined air passage and spark gap, means forming a conduit in communication with the passage and disposed centrally with respect to said series of plates, means for creating a silent discharge across said passages to form the air therein into ozone, and a pair of members engaging the upper and lower edge parts of the plates respectively and having grooves therein into which such edge parts fit.

4. In a water purifying apparatus, the combination of pairs of plates arranged to form an annular series, the plates of each pair being spaced apart to form therebetween a combined air passage and spark gap, means forming a conduit in the center of the annular series of plates, said conduit being in communication with the passages, means for creating a silent discharge across said passages to form the air therein into ozone, and means for directing into the conduit a stream of water with which the ozone is adapted to be affiliated.

5. In a water purifying apparatus, the combination of radially extending pairs of plates, the plates of each pair being spaced apart to form therebetween a combined air passage and spark gap, means forming a conduit in communication with the passages and disposed centrally with respect to said pairs of plates, means for creating a silent discharge across the passages to form the air therein into ozone, and a nozzle for directing into the conduit a stream of water of sufficient velocity that the ozone is drawn from the passages into contact with the water.

6. In a water purifying apparatus, the combination of radially extending pairs of plates, the plates of each pair being spaced apart to form therebetween a combined air passage and spark gap, the inner edges of said plates forming a central conduit into which the passages open, means for creating a silent discharge across said passages to form the air therein into ozone, and a nozzle extending into one end of the conduit for jetting a stream of water through said conduit with such force that a partial vacuum is formed whereby the ozone is drawn from the passages into contact with the water.

7. In an apparatus for purifying water, the combination of an elongated casing adapted to be positioned vertically, a device mounted in the upper end of the casing for electrically generating ozone, means forming a vertical conduit positioned centrally in the casing and adapted to receive ozone from the generating device, means housed in the casing above said generating device for delivering a stream of water into the upper end of the conduit, a storage receptacle connected to the lower end of the casing and provided at the upper end thereof with an upwardly facing duct adapted to discharge into said lower end of the casing, a pipe communicating with the lower end of the conduit and arranged to convey the water downwardly to the receptacle for discharge into the lower end of the casing via the upwardly facing duct, and a spout at one side of the casing for draining from said casing the water discharged through the duct.

8. In an apparatus for purifying water, the combination of an elongated casing adapted to be positioned vertically, a device mounted in the upper end of the casing for electrically generating ozone, means forming a vertical conduit positioned centrally in the casing and adapted to receive ozone from the generating device, means housed in the casing above said generating device for delivering a stream of water into the upper end of the conduit, a receptacle connected to the lower end of the casing, a pipe communicating with the lower end of the conduit and adapted to convey the water to the receptacle, a cover for the receptacle provided with an outlet or duct adapted to discharge the water from the receptacle into the lower end of the casing, and a spout at one side of the casing for draining from said casing the water discharged through the duct.

9. In an apparatus for purifying water, the combination of an elongated casing adapted to be positioned vertically, a device mounted in the upper end of the casing for electrically generating ozone, means forming a vertical conduit positioned centrally in the casing and adapted to receive ozone from the generating device, means housed in the casing above said generating device for delivering a stream of water into the upper end of the conduit, a receptacle connected to the lower end of the casing, a pipe communicating with the lower end of the conduit and adapted to convey the water to the receptacle, a cover for the receptacle provided with a tubular member extending around the pipe and operative to convey the water upwardly from the receptacle and discharge the same into the lower end of the casing in the form of thin streams, and a spout at one side of the casing for draining the water discharged from the cover-member.

10. In an apparatus for purifying water, the combination of an elongated casing adapted to be positioned vertically, a device mounted in the upper end of the casing for electrically generating ozone, means forming a vertical conduit positioned centrally in the casing and adapted to receive ozone from the generating device, means housed in the casing above said generating device for delivering a stream of water into the upper end of the conduit, a receptacle at the lower end of the casing, a discharge pipe communicating with the lower end of the conduit and adapted to convey the water to the receptacle, and a transformer for supplying electrical current to the generating device housed in the casing between the receptacle and said generating device.

11. In an apparatus for purifying water, the combination of an elongated casing adapted to be positioned vertically, a device mounted in the casing for electrically generating ozone, means forming a vertical conduit positioned centrally in the casing and adapted to receive ozone from the generating device, means housed in the casing above said generating device for delivering a stream of water into the upper end of the conduit, a discharge pipe for the water having one end thereof communicating with the lower end of the conduit, and a transformer for supplying electrical current to the generating device housed in the casing and mounted on the discharge pipe.

12. In an apparatus for purifying water, the combination of an elongated casing adapted to be positioned vertically, a plurality of electrically actuated ozone-forming units arranged radially and mounted in the upper end of the casing, means forming a vertical conduit positioned centrally with respect to the units and adapted to receive ozone therefrom, means housed in the casing above said generating device for delivering a stream of water into the upper end of the conduit, a receptacle at the lower end of the casing, and a pipe communicating with the lower end of the conduit and adapted to convey the water to the receptacle.

13. In an apparatus for purifying water, the combination of an elongated casing adapted to be positioned vertically, a plurality of electrically actuated ozone-forming units arranged radially and mounted in the upper end of the casing, means forming a vertical conduit positioned centrally with respect to the units and adapted to receive ozone therefrom, means housed in the casing above said generating device for delivering a stream of water into the upper end of the conduit, a discharge pipe for the water having one end thereof communicating with the lower end of the conduit, and a transformer for supplying electrical current to the units mounted in the lower end of the casing and extending around the discharge pipe.

14. In an apparatus for purifying water, the combination of an elongated casing adapted to be positioned vertically, a device mounted in the casing for electrically generating ozone, means forming a vertical conduit positioned centrally in the casing and adapted to receive ozone from the generating device, a valve housed in the casing above said device and provided with a discharge nozzle for delivering a stream of water into the upper end of the conduit, a discharge pipe for the water having one end thereof communicating with the lower end of the conduit, a switch for controlling the supply of electric current to the generating device, and means for conjointly shifting the valve and the switch.

Signed at Chicago, Illinois, this 21st day of June, 1929.

JAMES MARLOWE DAILY.